United States Patent
Lee et al.

(10) Patent No.: US 7,324,793 B2
(45) Date of Patent: Jan. 29, 2008

(54) WIRELESS TRANSMISSION DEVICE CAPABLE OF TRANSMITTING MEDIA FROM MULTIPLE CHANNELS

(75) Inventors: Cheng-Nan Lee, Taipei Hsien (TW); Chen-Chia Huang, Taipei Hsien (TW)

(73) Assignee: Wistron NeWeb Corporation, Hai-Chih, Taipei Hsien (TW)

( * ) Notice: Subject to any disclaimer, the term of this patent is extended or adjusted under 35 U.S.C. 154(b) by 385 days.

(21) Appl. No.: 10/907,656

(22) Filed: Apr. 11, 2005

(65) Prior Publication Data

US 2006/0183452 A1   Aug. 17, 2006

(30) Foreign Application Priority Data

Feb. 16, 2005   (TW) .............................. 94104538 A

(51) Int. Cl.
H04B 7/08  (2006.01)
H04B 1/18  (2006.01)

(52) U.S. Cl. .................. 455/130; 455/140; 455/179.1; 455/189.1; 455/313; 455/552.1

(58) Field of Classification Search ...... 455/3.02–3.06, 455/552.1–553.1, 102–103, 132–140, 179.1, 455/180.1, 189.1, 313–324
See application file for complete search history.

(56) References Cited

U.S. PATENT DOCUMENTS 5,170,413 A * 12/1992 Hess et al. .................. 375/260
5,812,605 A * 9/1998 Smith et al. ................. 375/308
5,983,113 A * 11/1999 Asanuma ..................... 455/506
6,473,593 B1 * 10/2002 Groff .......................... 455/3.01
6,920,185 B2 * 7/2005 Hinson ........................ 375/295
7,113,748 B2 * 9/2006 Shapira et al. ............. 455/63.4
2002/0089995 A1 * 7/2002 Shalvi et al. ............... 370/431
2004/0042564 A1   3/2004 Chen
2004/0258093 A1 * 12/2004 Powell ....................... 370/480
2005/0238116 A1 * 10/2005 Monta ......................... 375/298
2006/0063490 A1 * 3/2006 Bader et al. .................. 455/45
2007/0116209 A1 * 5/2007 Geile et al. ............. 379/93.01

FOREIGN PATENT DOCUMENTS

CN   1508977 A   6/2004

* cited by examiner

Primary Examiner—Simon Nguyen
(74) Attorney, Agent, or Firm—Winston Hsu

(57) ABSTRACT

A wireless transmission device capable of transmitting media from different channels concurrently. The transmitter of the device places the inputted TV signals and an audio/video signal on different segments of a frequency spectrum, combines the signals of all segments into one combined signal, and transmits the combined signal as a radio frequency signal so as to transmit signals from different channels at the same time. Meanwhile, a controller in the receiver of the device selects a needed channel signal from the received radio frequency signal according to a selection signal. Therefore with one A/V transmitter and multiple A/V receivers, multiple-channel media transmission and multiple-channel media reception is achieved.

11 Claims, 5 Drawing Sheets

WIRELESS TRANSMISSION DEVICE CAPABLE OF TRANSMITTING MEDIA FROM MULTIPLE CHANNELS

BACKGROUND OF INVENTION

1. Field of the Invention

The present invention relates to a wireless transmission device, and more particularly, to a wireless transmission device capable of transmitting media from multiple channels.

2. Description of the Prior Art

With the development of wireless transmission technology, wireless communication applications have become more and more widely used in every aspect of life. As well as wireless network and wireless communication, the technology has applications in the field of multimedia. A conventional Audio/Video (A/V) facility has at least a media source, ex. Cable TV source, VCD player or DVD player, and a display device for displaying the media such as a cathode ray tube (CRT) television, liquid crystal display (LCD) television, plasma display panel (PDP) television, projector, etc. Since the media source and the display device are generally not situated far from each other, a substantial signal line is used for short distance connection.

Recently, however, the chances that the media source and the display device will be situated in two places far away from each other have become more common, due to user preference or certain requirements. For instance, when a user wants to watch a movie on their personal computer in their room but the movie is played through a DVD player in the sitting room, a conventional connection method using a substantial signal wire will require a much longer signal wire or may even be unachievable. Another aspect of this situation is that conventional physical connection of signal wires results in the problem of untidy complicated wiring. Hence the emergence of wireless A/V transceivers effectively solves the above-mentioned problem by using wireless transmission technology as an A/V signal transmission media between the media source and the display device.

Please refer to FIG. 1, which is a functional diagram of a prior art wireless A/V transceiver 10. The wireless A/V transceiver 10 comprises an A/V transmitter 20 and an A/V receiver 60. The A/V transmitter 20 comprises an A/V modulator 22, a mixer 24, a channel selector 26, a radio frequency amplifier 28 and a signal transmitter 30. The A/V receiver 60 comprises an A/V demodulator 62, a mixer 64, a channel selector 66, a radio frequency low noise amplifier (RFLNA) 68, a signal receiver 70 and a bandpass filter 72. Firstly, one input end of the A/V transmitter 20 receives A/V signals from an A/V source and the A/V modulator 22 modulates the A/V signals. Then the channel selector 26 generates a high frequency of 2.4 GHz and modulates the base band audio and video signals to the 2.4 GHz frequency band, and the radio frequency amplifier 28 and the signal transmitter 30 transmit the A/V content in the form of radio signals. The other input end of the A/V receiver 60 receives the radio signals of A/V content with the signal receiver 70 and the RFLNA 68. Then the channel selector 66 and the mixer 64 down convert the A/V content at a high frequency of 2.4 GHz to base band A/V signals, the bandpass filter 72 filtering out noise of the base band signals, and finally the A/V demodulator 62 demodulates the base band A/V signals into separate audio and video signals acceptable for media players. In summary, the physical signal wire is replaced by the radio signals of a 2.4 GHz frequency band.

Please refer to FIG. 2 for a functional diagram of a prior art wireless A/V transceiver 15 with TV tuner 50. If the A/V transceiver 15 further provides a function of broadcasting Cable TV signals, then the TV tuner 50 demodulates the inputted Cable TV signals into a video signal and an audio signal and transmits the demodulated A/V signals through the prior art A/V transmitter 20 in the form of radio signals.

Even with these improvements, a prior art A/V transceiver 10 or an A/V transceiver 15 with TV tuner 50 can only transmit one set of A/V signals at one time via radio transmission. In most countries, radio communication transmission in the Industrial, Science and Medical frequency band (ISM band) is regulated by being commonly divided into four segments under the consideration of allowed continuous bandwidth and A/V signal requirement, which means four practical channels are used for radio transmission in the ISM band. But the prior art wireless A/V transceiver 15 cannot concurrently transmit four different sets of wireless A/V signals with only one A/V transmitter 20. If four segments of the bandwidth of ISM band are to be fully used for four different A/V signals, four separate wireless A/V transceivers 15, i.e., four separate sets of A/V transmitters 20 and A/V receivers 60, become a necessary requirement. The difficulties of realizing such a complicated input-output wiring configuration, and the great expense involved, means that this is not a practical option.

SUMMARY OF INVENTION

Therefore, the primary objective of the present invention is to provide a wireless transceiver to solve the above-mentioned problem.

The present invention provides a wireless transmission device capable of transmitting media from multiple channels. The transmission device comprises: a plurality of frequency selectors for changing the frequency of a signal received by each frequency selector; a plurality of bandpass filters for filtering signals modulated by the frequency selector, wherein each bandpass filter is coupled with one of the plurality of frequency selectors; a signal combiner coupled with the plurality of bandpass filters for mixing signals outputted by the plurality of bandpass filters; an upconverter coupled with the signal combiner for up converting the frequency of signals outputted by the signal combiner; and a signal transmitter coupled with the upconverter for transmitting signals outputted by the upconverter.

The present invention also provides a wireless reception device capable of receiving media from multiple channels. The reception device comprises: a signal receiver for receiving radio signals; a downconverter coupled with the signal receiver for down converting the frequency of a radio signal received by the signal receiver; a splitter; and a controller coupled with the downconverter for controlling the downconverter according to a selective signal to down convert the frequency of radio signals received by the signal receiver. The splitter comprises an input port coupled with the downconverter for receiving signals from the downconverter, and a plurality of output ports for outputting signals inputted to the input port.

The present invention also provides a wireless transceiver capable of transferring media of multiple channels. The wireless transceiver comprises a wireless transmission device for transmitting media from multiple channels, and a wireless reception device for receiving media from multiple channels. The wireless transmission device comprises: a plurality of frequency selectors for changing the frequency of a signal received by each frequency selector; a plurality of bandpass filters for filtering signals modulated by the frequency selector, wherein each bandpass filter is coupled with one of the plurality of frequency selectors; a signal combiner coupled with the plurality of bandpass filters for mixing signals outputted by the plurality of bandpass filters; an upconverter coupled with the signal combiner for up converting the frequency of a signal outputted by the signal combiner; and a signal transmitter coupled with the upconverter for transmitting signals outputted by the upconverter. The wireless reception device comprises: a signal receiver for receiving radio signals; a downconverter coupled with the signal receiver for down converting the frequency of radio signals received by the signal receiver; a splitter; and a controller coupled with the downconverter for controlling the downconverter according to a selective signal to down convert the frequency of radio signal received by the signal receiver. The splitter of the wireless reception device comprises an input port coupled with the downconverter for receiving signals from the downconverter, and a plurality of output ports for outputting signals inputted to the input port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
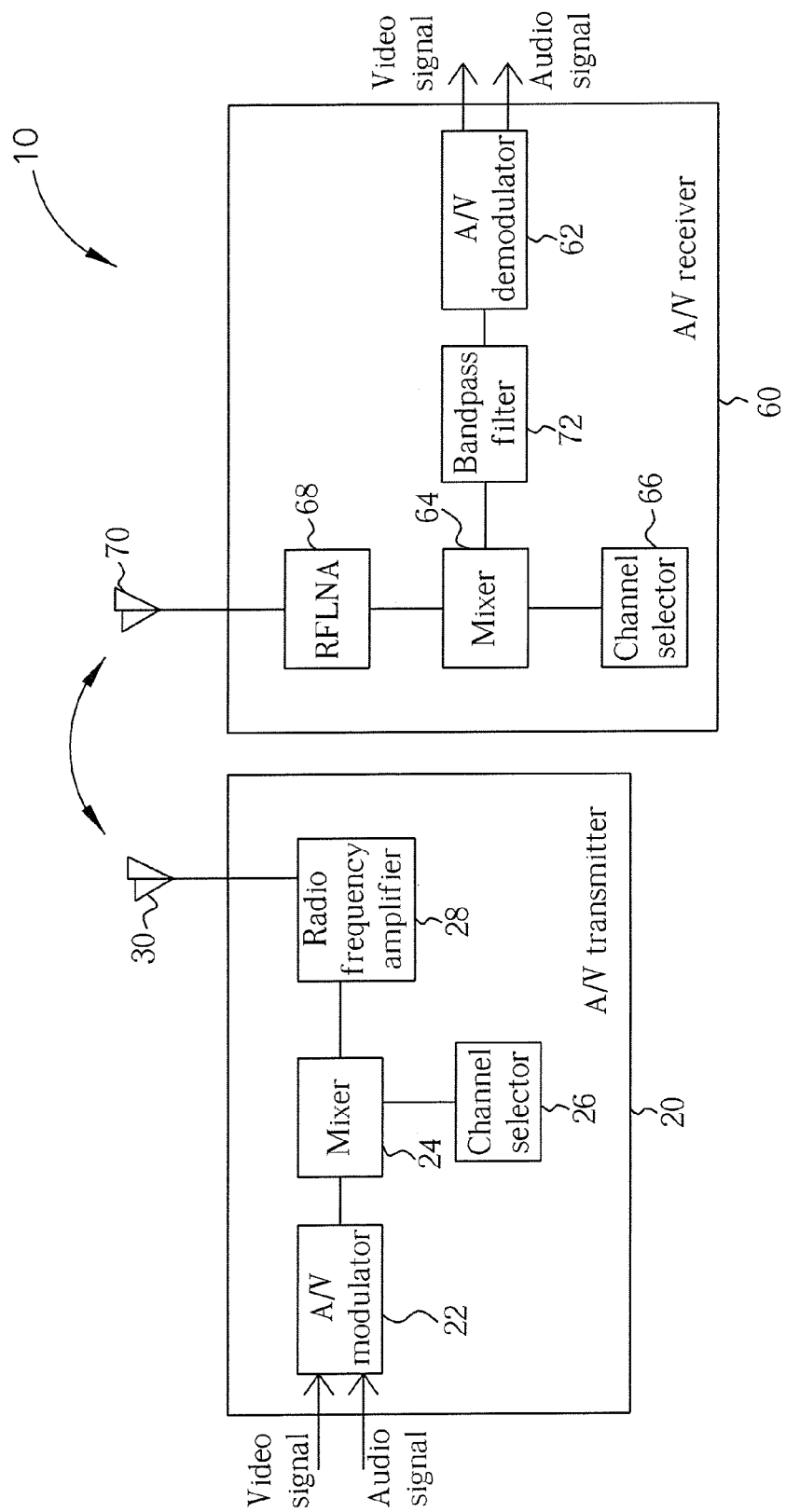
FIG. 1 is a functional diagram of a prior art wireless A/V transceiver.
Figure 2:
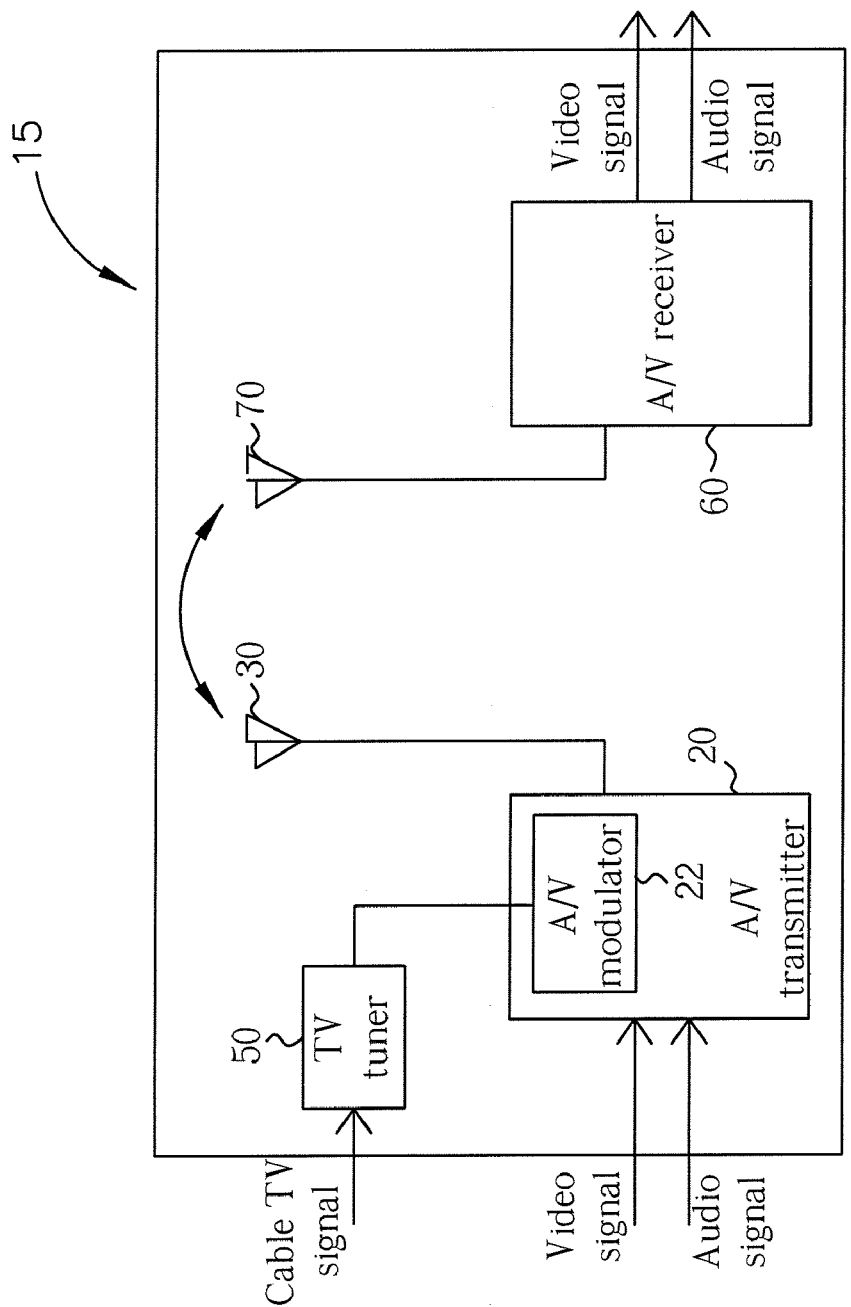
FIG. 2 is a functional diagram of a prior art wireless A/V transceiver with TV tuner.
Figure 3:
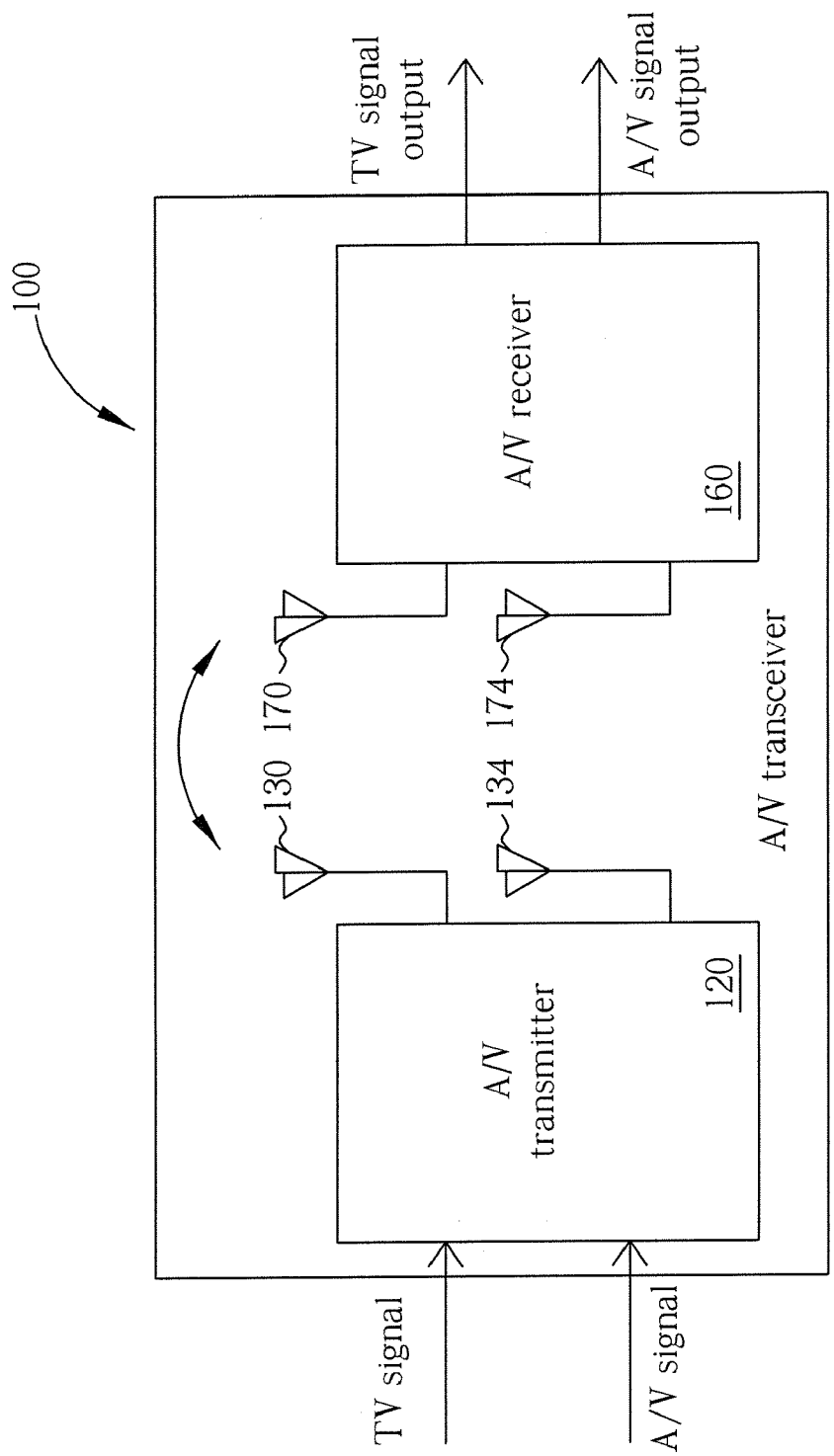
FIG. 3 is a functional diagram of the present invention wireless A/V transceiver.

Please refer to FIG. 3. FIG. 3 is a functional diagram of the present invention wireless A/V transceiver 100. The A/V transceiver 100 comprises an A/V transmitter 120 and an A/V receiver 160. The A/V transmitter 120 is capable of receiving input signals from a TV or Audio/Video device while the A/V receiver 160 outputs TV signals or A/V signals. The A/V transmitter 120 transmits wireless A/V signals to a signal receiver 170 of the A/V receiver 160 through a signal transmitter 130 of the A/V transmitter 120. The A/V receiver 160 comprises a signal transmitter 174 for transmitting a control signal sent by a user (e.g. an infrared remote controller) to a signal receiver 134 in the A/V transmitter 120.

Figure 4:
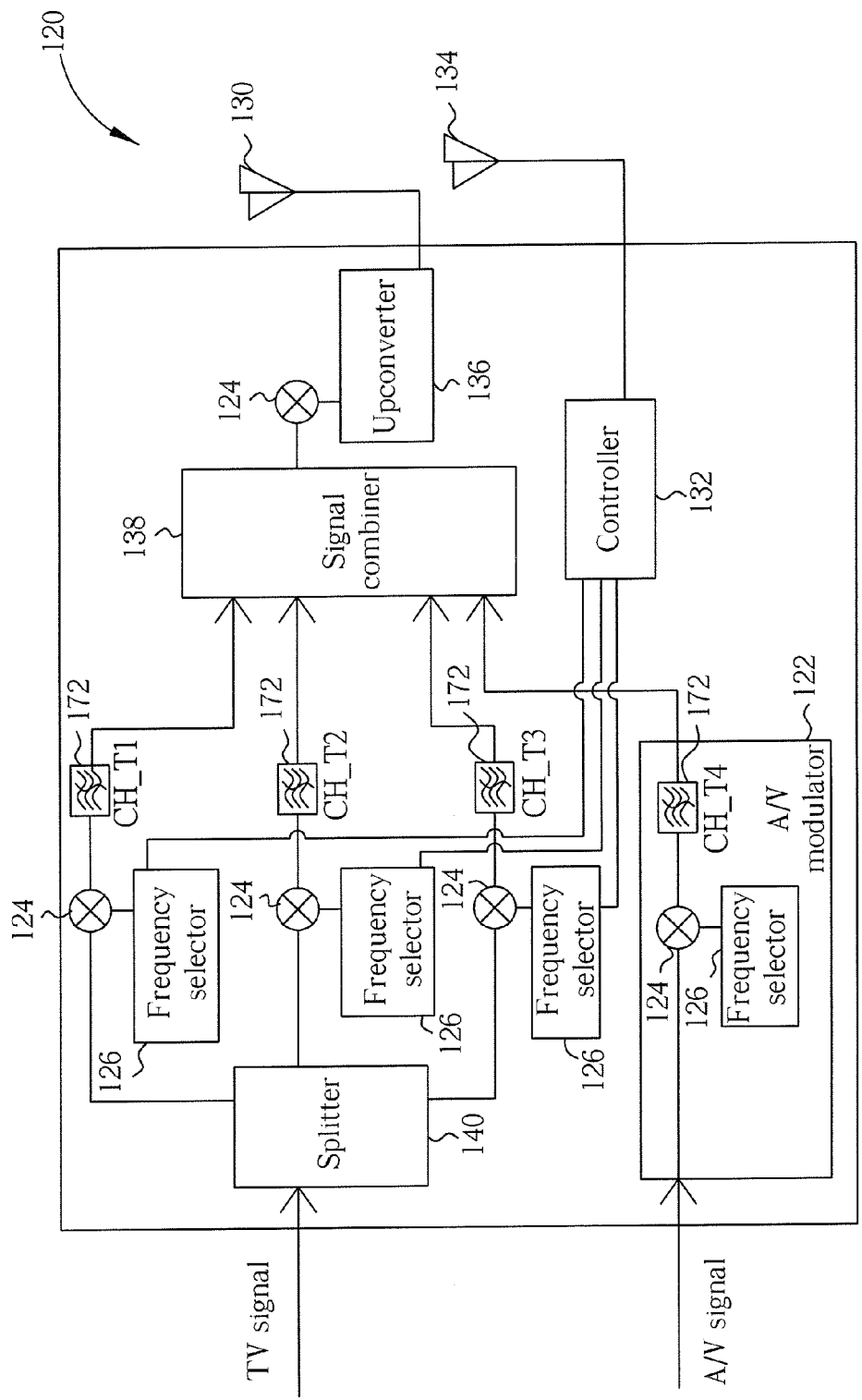
FIG. 4 is a functional diagram of an A/V transmitter of the A/V transceiver in FIG. 3.

Please refer to FIG. 4. FIG. 4 is a functional diagram of the A/V transmitter 120 of the A/V transceiver 100. As FIG. 4 shows, the A/V transmitter 120 comprises an A/V modulator 122, a plurality of frequency selectors 126, a plurality of mixers 124, a plurality of bandpass filters 172, a signal transmitter 130, a controller 132, a signal receiver 134, an upconverter 136, a signal combiner 138, and a splitter 140. The splitter 140 comprises an input port and a plurality of output ports, which output a plurality of signal channels respectively. When TV signals enter the input port of the splitter 140, the plurality of output ports output the TV signals to the plurality of mixers 124 that are respectively coupled with the plurality of frequency selectors 126. Here, we take as an example the TV signal outputted by a first output port, i.e. a TV signal on a first signal channel. The frequency selector 126 generates a frequency and the mixer 124 applies the frequency on the TV signal going through the first signal channel; therefore, a specific TV program channel within the frequency band is selected. Then, coupled with the mixer 124, the bandpass filter 172 corresponding to the first frequency segment CH_T1 of the radio frequency band filters the mixed TV signal and outputs the TV signal carrying the specific TV program channel to the signal combiner 138.

As mentioned before, the ISM band (Industrial Scientific Medical band) is generally divided into four or more segments. As FIG. 4 shows, the A/V transmitter 120 transmits TV signals with four segments of ISM band using the splitter 140. The frequency selector 126 in each signal channel shifts the TV signal to a specific frequency band and then the bandpass filter 172 filters the shifted TV signal. Afterwards, the plurality of bandpass filters 172 align the TV signals of every signal channel on a different frequency segment, and then the signal combiner 138 coupled with the plurality of bandpass filters 172 combines the TV signals outputted from the plurality of bandpass filters 172 into a combined signal. Finally, the upconverter 136 coupled with the signal combiner 138 and another mixer 124 up convert the combined signal to the frequency spectrum of ISM band, which is then transmitted by the signal transmitter 130 to the A/V receiver 160.

The present invention A/V transmitter 120 uses two sets of mixers 120 to process the signals. Since the TV signal is a high frequency signal, after being outputted from the plurality of output ports of the splitter 140, the frequency selector 126 and mixer 124 on each signal channel down convert the plurality of high frequency signals to a plurality of low frequency signals. This enables the following plurality of bandpass filters 172 to more easily implement filtering the low frequency signals. Then the upconverter 136 up converts the combined signal to the high frequency of 2.4 GHz for radio transmission. Additionally, the plurality of TV signals outputted by the plurality of output ports of the splitter 140 are put on different segments of the frequency spectrum by each frequency selector 126 and bandpass filter 172 on each signal channel, so the combined signal that comes out of the mixer 124 can include signals having four or more segments of TV signals; therefore, the present invention A/V transmitter 120 can concurrently transmit four or more segments of radio signals.

The controller 132 coupled with the plurality of frequency selectors 126 dominates the frequency selection of the above frequency selector 126. The controller 132 is for controlling the plurality of frequency selectors 126 to change the frequency of a received input signal according to a selective signal inputted to the controller 132. The signal receiver 134, coupled with the controller 132, is for transmitting the selective signal to the controller 132 by radio signals.

The system described above is one of the exemplary embodiments of the present invention. In another exemplary embodiment of the present invention A/V transceiver 100, the A/V transmitter 120 deals with not only TV signals but also audio/video signals from an external A/V media device such as a video recorder, CD player, DVD player or any similar device. The A/V modulator 122 of the A/V transmitter 120 receives the A/V signal from an external device. The A/V modulator 122 further comprises a frequency selector 126, a mixer 124, and a bandpass filter 172. Similar to before, the frequency selector 126 and the bandpass filter 172 of the A/V modulator 122 are used for converting the A/V signal to one of the segments of radio frequency spectrum, in other words, the A/V signal shares another signal channel of the four segments of radio frequency spectrum. The signal combiner 138 also combines the converted A/V signal with TV signals on other signal channels into a combined signal, and sends the combined signal to the upconverter 136 for a follow-up transmission by radio signal. The present invention A/V transceiver 100 can transmit both TV signals and A/V signals without restricting the use of signal channels. For example, considering the common four segments radio frequency band transmission, the A/V transceiver 100 can assign channels 1 through 3 as TV signal transmission and channel 4 as A/V signal transmission, or in another case, all four channels can be assigned to TV signal transmission. The assignment of the four channels is flexible and not limited to the examples mentioned above.

Figure 5:
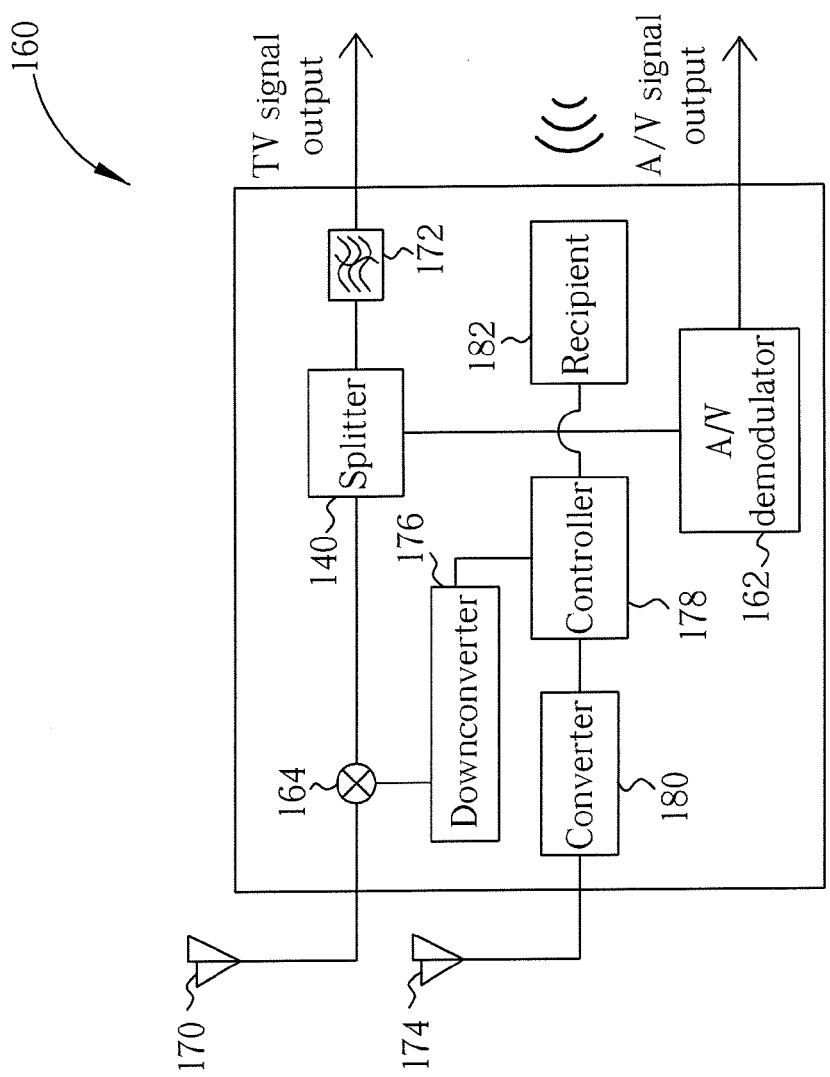
FIG. 5 is a functional diagram of an A/V receiver of the A/V transceiver in FIG. 3.

Please refer to FIG. 5, which is a functional diagram of an A/V receiver 160 of the present invention A/V transceiver 100. The A/V receiver 160 comprises a signal receiver 170, a downconverter 176, a mixer 164, a splitter 140, a controller 178, a converter 180, a signal transmitter 174, a recipient 182, and an A/V demodulator 162. The splitter 140 comprises an input port and a plurality of output ports. The input port is coupled with the mixer 164 for receiving the signals transmitted from the downconverter 176, and the plurality of output ports output signals inputted to the input port.

When the signal receiver 170 of the A/V receiver 160 receives the radio signal from the signal transmitter 130 of the A/V transmitter 120, the downconverter 176 and the mixer 164 coupled with the signal receiver 170 will down convert the frequency of the received radio signal for the next processing. The downconverter 176 is further coupled with the controller 178, which is for controlling the downconverter 176 according to a selective signal from the recipient 182 to down convert the frequency of radio signals received by the signal receiver 170. In other words, when a user transmits a selective signal using an infrared remote controller, a blue tooth remote controller, or any other radio-based controller, the recipient 182 receives and transmits the selective signal to the controller 178 to control the downconverter 176. As mentioned above, one of the exemplary embodiments of the present invention A/V transceiver 100 can concurrently transmit four sets of wireless A/V signals with four segments in the radio frequency spectrum. Hence, a user can choose to receive any channel of the A/V signals using a remote controller. If the A/V signal of the first channel CH_T1 is the selection, the recipient 182 receives the selective signal and transmits the selective signal to the controller 178 to control the downconverter 176 to down convert the radio signal received by the signal receiver 170 to the first channel CH_T1 and to be filtered by the bandpass filter 172.

The user can also choose to output the TV channel or the A/V channel. After the A/V receiver 160 receives radio signals including TV signals and A/V signals, the radio signal is down converted by the downconverter 176 and transmitted to the input port of the splitter 140. The output ports of the splitter 140 then transmit to the TV signal output and the A/V signal output respectively. If the user chooses to output the TV signal, the bandpass filter 172 coupled with the splitter 140 filters the signal and outputs the signal to the TV signal output. If the user chooses to output the A/V signal, the A/V demodulator 162 will demodulate the signal and transmit the signal to the A/V signal output. To take the concept further, the user can control the A/V receiver 160 with a remote controller to not only choose the signal channel. If the TV signal is chosen, the user can even select a specific TV program channel in that segment. By receiving the selective signal with the recipient 182, the converter 180 coupled with the controller 178 converts the selective signal to a radio control signal. The signal transmitter 174 can then transmit the control signal to the signal receiver 134 of the A/V transmitter 120 in FIG. 4. The control signal will change the channel frequency of one channel, hence selecting one specific program channel of the TV signal.

The A/V transmitter 120 of the present invention A/V transceiver 100 uses a splitter 140 and a frequency selector 126 to select a TV channel and modulate the TV signal into the radio signal without using a TV tuner as in the prior art. Using a signal combiner 138, the A/V transmitter 120 combines a plurality of signal channels of TV signals and an A/V signal into a specific frequency band, and the combined signal can be transmitted directly by radio signal and received by the A/V receiver 160. The A/V receiver 160 can output any segment of the combined signal using a frequency selector 176 and a splitter 140. In such a way, one A/V transmitter 120 and a plurality of A/V receivers 160 can be used to transmit and receive multiple media at the same time, thus practically saving a great deal of cost of devices and removing the limitation that the prior art wireless A/V transceiver transmits single media at one time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless reception device capable of receiving media from multiple channels, the reception device comprising:
   a signal receiver for receiving radio signals;
   a single downconverter coupled with the signal receiver for down converting the frequency of a selected radio signal received by the signal receiver;
   a splitter comprising:
      an input port coupled with the downconverter for receiving signals from the downconverter; and
      a plurality of output ports for outputting signals inputted to the input port; and
   a controller coupled with the downconverter for controlling the downconverter according to a selective signal used to select the selected radio signal in order to down convert the frequency of the selected radio signal received by the signal receiver.

2. The reception device of claim 1 further comprising:
   a converter coupled with the controller for converting the form of the selective signal received by the controller; and
   a signal transmitter coupled with the converter for transmitting radio signals from the converter.

3. The reception device of claim 1 further comprising a recipient coupled with the controller for receiving the selective signal.

4. The reception device of claim 1 further comprising a demodulator coupled with an output port of the splitter for demodulating signals from the output port.

5. A wireless transceiver capable of transferring media of multiple channels, the transceiver comprising:
   a wireless transmission device for transmitting media from multiple channels, the transmission device comprising:
      a plurality of frequency selectors for changing the frequency of signal received by each frequency selector;

a plurality of bandpass filters, each bandpass filter coupled with one of the plurality of frequency selectors, the plurality of bandpass filters for filtering signals modulated by the frequency selector;

a signal combiner coupled with the plurality of bandpass filters for mixing signals outputted by the plurality of bandpass filters;

an upconverter coupled with the signal combiner for up converting the frequency of signal outputted by the signal combiner; and a signal transmitter coupled with the upconverter for transmitting signals outputted by the upconverter; and a wireless reception device for receiving media from multiple channels, the reception device comprising:

a signal receiver for receiving radio signals;

a single downconverter coupled with the signal receiver for down converting the frequency of a selected radio signal received by the signal receiver;

a splitter comprising:

an input port coupled with the downconverter for receiving signals from the downconverter; and a plurality of output ports for outputting signals inputted to the input port; and a controller coupled with the downconverter for controlling the downconverter according to a selective signal used to select the selected radio signal in order to down convert the frequency of the selected radio signal received by the signal receiver.

6. The transceiver of claim 5 wherein the transmission device further comprises a splitter having an input port and a plurality of output ports for outputting signal inputted to the input port with the plurality of output ports, wherein each of the plurality of frequency selectors is respectively coupled with each of the plurality of output ports for changing the frequency of signal transmitted from the splitter.

7. The transceiver of claim 5 wherein the wireless transmission device further comprises a controller coupled with the plurality of frequency selectors for controlling the plurality of frequency selectors to change the frequency of a received input signal according to a selective signal inputted to the controller.

8. The transceiver of claim 7 wherein the transmission device further comprises a signal receiver coupled with the controller for transmitting the selective signal to the controller by radio signals.

9. The transceiver of claim 5 wherein the reception device further comprises:

a converter coupled with the controller for converting the form of the selective signal received by the controller; and a signal transmitter coupled with the converter for transmitting radio signals from the converter.

10. The transceiver of claim 5 wherein the reception device further comprises a recipient coupled with the controller for receiving the selective signal.

11. The transceiver of claim 5 wherein the reception device further comprises a demodulator coupled with an output port of the splitter for demodulating signals from the output port.

* * * * *

UNITED STATES PATENT AND TRADEMARK OFFICE
CERTIFICATE OF CORRECTION

PATENT NO.       : 7,324,793 B2                                           Page 1 of 1
APPLICATION NO.  : 10/907656
DATED            : January 29, 2008
INVENTOR(S)      : Cheng-Nan Lee et al.

It is certified that error appears in the above-identified patent and that said Letters Patent is hereby corrected as shown below:

On the title page, item (73), correct the residence of the assignee from "Hai-Chih" to -- "His-Chih" --

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,324,793 B2  Page 1 of 1
APPLICATION NO. : 10/907656
DATED : January 29, 2008
INVENTOR(S) : Cheng-Nan Lee et al.

It is certified that error appears in the above-identified patent and that said Letters Patent is hereby corrected as shown below:

On the title page, item (73), correct the residence of the assignee from "Hai-Chih" to -- "Hsi-Chih" --

This certificate supersedes the Certificate of Correction issued July 8, 2008.

Signed and Sealed this

Twenty-sixth Day of August, 2008

JON W. DUDAS
*Director of the United States Patent and Trademark Office*